United States Patent [19]
Langelin et al.

[11] Patent Number: 5,552,366
[45] Date of Patent: Sep. 3, 1996

[54] METHOD OF FOLIAR APPLICATION OF MAGNESIUM HYDROGEN CARBONATE

[75] Inventors: Henri-Rene Langelin, Caffiers, France; Robert Goffin, Trooz, Belgium

[73] Assignee: Lhoist Recherche et Developpment S.A., Ottignies-Louvain-La-Neuve, Belgium

[21] Appl. No.: 253,604

[22] Filed: Jun. 3, 1994

Related U.S. Application Data

[63] Continuation of Ser. No. 777,323, filed as PCT/BE90/00024 May 30, 1990, abandoned.

[30] Foreign Application Priority Data

May 31, 1989 [BE] Belgium ................ 08900589

[51] Int. Cl.⁶ ................ A01N 59/06; C05D 5/00
[52] U.S. Cl. ................ 504/116; 71/63
[58] Field of Search ................ 504/116, 353; 71/63

[56] References Cited

U.S. PATENT DOCUMENTS 3,532,485  10/1970  Stevens ................ 71/1
4,689,067  8/1987  Kückens et al. ................ 71/65

FOREIGN PATENT DOCUMENTS 0523593  8/1921  France.
1382420  1/1975  United Kingdom.

OTHER PUBLICATIONS

Hers, Dieter. *Plant Physiology*, NY: Springer–Verlog, 1975 pp. 38–40.
Pascal, *Nouveau traite de chimie minerale*, IV:228–234 (1958).

*Primary Examiner*—S. Mark Clardy
*Attorney, Agent, or Firm*—Sughrue, Mion, Zinn, Macpeak & Seas

[57] ABSTRACT

A dilute aqueous solution containing less than 80 g/l of magnesium hydrogen carbonate of formula $Mg(HCO_3)_2$ can be used for the curative treatment of plants attacked by magnesium deficiency or preventively as complementary magnesium fertilizer and as photosynthetic activator of growth of plants by simple spraying onto them.

An aqueous solution of magnesium hydrogen carbonate $Mg(HCO_3)_2$ is prepared from MgO as starting material by mixing it into water and by treating the solution or suspension thus obtained with gaseous carbon dioxide, at a temperature below 40° C. under a pressure greater than $5\times10^5$ pascals (5 bars).

3 Claims, 10 Drawing Sheets

5,552,366

METHOD OF FOLIAR APPLICATION OF MAGNESIUM HYDROGEN CARBONATE

This is a Continuation of parent application Ser. No. 07/777,323, filed as PCT/BE90/00024 on May 30, 1990, now abandoned.

The present invention relates to a process for the treatment of chlorophyllous plants, in particular the curative treatment of chlorophyllous plants attacked by primary magnesium deficiencies and the preventive treatment of the deficiencies induced by nutritional imbalances or ecophysiological conditions. Silviculture, large-scale cultivation, market gardening and horticulture in the open air or in greenhouses all constitute important sectors for application of the above described process.

The metabolic activity of a plant depends on a large number of factors, of which the most important are the environmental factors, especially the climate and the supply of minerals (N, P, K etc.). To determine the effect of one factor on this activity, it is essential on the one hand to control all the other factors by maintaining them constant (especially light, the humidity and the temperature), and on the other hand it is necessary to have available a certain number of appropriate techniques enabling this activity to be determined rapidly and non-destructively. It is not possible, in the open, to simultaneously maintain constant the light, temperature and mineral supply, it is therefore necessary to carry out these cultivations under controlled conditions, for example in a thermostatically controlled cultivation chamber where all the factors are maintained constant. A series of rapid physiological tests in vivo, based on the photosynthetic activity of plants, has been developed in recent years to determine their state of "health". These tests have enabled the role of magnesium in the activity of the plant to be clarified.

The solution of the soil is known to have a $Mg^{2+}$ ion concentration which is generally higher than that of the $K^+$ ion. The low capacity of the roots for absorbing the $Mg^{2+}$ ion is not linked exclusively to the root system. It is true for other parts of the plant. A hypothesis which explains the low capacity of plants for absorbing the $Mg^{2+}$ ion is developed in the paper "The influence of certain experimental parameters on the flux characteristics of $Mg^{2+}$ in the case of barley seedings grown in hydroculture", by C. Schimansky (Landw. Forsch., Vol. 34, 1982, pages 154 to 165).

This would involve a special mechanism for the transport of the $Mg^{2+}$ ion across the cellular membranes. This transport would be passive, modulated by the ionophores where the $Mg^{2+}$ ion would follow the electrochemical gradient. The ionic competition would handicap the absorption of the $Mg^{2+}$ ion to the advantage of other cations in excess, especially the $K^+$ cation and the $NH_4^+$ cation, to the extent of producing a deficiency of the $Mg^{2+}$ ion in the plant. Not only the absorption but also the translocation of the $Mg^{2+}$ cations of the roots towards the overground parts of the plant would be limited by the ionic competition of the $K^+$ ion or the $Ca^{2+}$ ion. On the other hand, the $NO_3^-$ anions would have a positive effect on the absorption of the $Mg^{2+}$ ion.

A paper by H. Grimme et al, entitled "Potassium, calcium and magnesium interactions as related to cation uptake and yield" (Landw. Forsch., 30/11, 1974, Sonderh. 93–100) shows that a high concentration of $Mg^{2+}$ ion can be obtained in a plant with a low supply of the $K^+$ ion. Grimme has shown also that the reduction of the pH of the soil leads to a large solubilization of aluminium ions, which leads in turn to a reduction of the absorption of $Mg^{2+}$ ions. The cationic antagonism between the $Mg^{2+}$ ion and the $K^+$ ion is, in the case of an abundant supply of $K^+$ ions, the cause of a reduction of the $Mg^{2+}$ ion content of the roots and leaves. But in the fruits and the reserve tissues there is found, on the contrary, a large accumulation of $Mg^{2+}$ ions despite a large supply of $K^+$ ion. The $Mg^{2+}$ ion is much more mobile in the phloem and can easily be translocated from old leaves to the young leaves, the apex or the reserve organs of the plant.

The biochemical role of the magnesium in the plant is described in "Chloroplast and cell—The movement of certain key substances across the chloroplast envelope" by D. A. Walker (Int. Review of Science, Plant Bioch., Butterworths, Series I, Vol. II, 1974, p. 1–49).

It is reported there that a large proportion, about 70%, of the total magnesium of a plant exists in a diffusible form associated with inorganic anions and with anions of organic acids such as malate and citrate.

The most important and best-known biochemical role of magnesium in plants is its presence at the centre of the chlorophyll molecule. Nevertheless the fraction of the magnesium associated with this role represents only 15 to 20% of the total of magnesium present in the plant.

The function as the cofactor of numerous fundamental enzymatic reactions causes magnesium to be a very important element in the plant: it participates in the phosphorylation process, where it forms a bridge between the pyrophosphate form of ATP or ADP and the enzyme molecule, which leads to the activation of the ATPase. Other enzymes, such as dehydrogenase and enolase are also activated by the $Mg^{2+}$ ion. Another key function of the magnesium is the activation of ribulose-diphosphate-carboxylase. The illumination of the leaf leads to a massive entry of the $Mg^{2+}$ ion into the stroma in exchange for protons ($H^+$), which creates the optimum conditions for the activity of the carboxylase. This favourable effect of the $Mg^{2+}$ ion in the assimilation of $CO_2$ and the production of sugars which is associated with it is probably the result of the activation of the ribulose-diphosphate-carboxylase.

According to the paper "Influence of surface charges on thylakoid structure and function" by J. Barber (Ann. Rev. Plant Physiol. 33, 1982), the $Mg^{2+}$ cation is the most important cation in the neutralization of diffusible cations in the thylakoid membranes. Generally, when a plant is deficient in magnesium, the proportion of nitrogen in the protein form falls and the non-protein form rises. The protein deficiency is probably caused by the dissociation of the ribosomes into the form of sub-units in the absence of the $Mg^{2+}$ ion. The magnesium appears to be a stabilizer of the ribosomes in the configuration necessary for protein synthesis.

The symptoms of magnesium deficiency differ according to the plant species, but certain general characteristics are the same. A magnesium deficiency shows itself first on the old leaves, the symptoms subsequently reaching into the young leaves. Generally the leaf blade takes on a yellow colour as far as to necrosis, even though the veins remain green.

Recently quantitative tests have been developed to determine the photosynthetic activity of a plant. Photosynthesis is the basis of the metabolism of the plant through the primordial role it plays in the conversion of the light energy into chemical energy utilizable by all the metabolic and synthetic processes. It is a complex operation in which two types of reaction can be distinguished. The ones called light reactions, as they are directly dependent on the light, provide the photochemical act, by which the luminous energy is converted into metabolites, which is the starting point for carbonaceous syntheses and chemical energy sources. The others, called dark reactions, surround the photochemical act, providing it with the starting metabolites, and extend it towards the syntheses or the regeneration of the precursors. The photochemical act is only possible through the involvement of absorbing pigments.

Two photoreceptor systems exist, one functioning in the red at relatively short wavelengths (about 680 nm), called PS2, and the other at longer wavelengths (700 nm) called PS1. These two photosystems are connected by an electron transfer chain, consisting of quinones, plastoquinones and cytochromes.

The pigments of the leaves of plants (chlorophylls and carotenoids) absorb light, whose energy is utilized in the primary photochemical reactions of photosynthesis. A part of the luminous energy absorbed is, however, dissipated in the form of heat (about 80%) or re-emitted in the form of fluorescence (about 2 to 3%).

This reemission, which constitutes the chlorophyllous fluorescence, occurs at wavelengths greater than those of the absorption spectrum of the chlorophylls. The measurement of the fluorescence of the chlorophyll, which at the physiological temperatures originates essentially from the PS2 system, provides valuable information on the functioning of the photochemical mechanism of the chloroplasts (Schreiber, 1983; Krause and Weis, 1984; Briantais et al, 1986). See on this subject "Chlorophyll and fluorescence of higher plants: chloroplasts and leaves" by Briantais et al, cited by Govindjec et al in "Light emission by plants and bacteria" (Academic Press, N.Y., p. 539–584).

As a matter of fact, when a leaf has adapted to the darkness and is then brought back into the light, the yield of the chlorophyllous fluorescence varies according to relatively complex kinetics (rapid growth of the intensity of the fluorescence followed by a slow reduction towards a stationary state), owing to the progressive activation of photosynthetic mechanisms (this phenomenon of induction of the fluorescence is called the "Kautsky effect"). This fluorescence, observable solely in the photosynthetically active tissues, depends on various photochemical processes which can be studied indirectly, for example the redox state of the primary electron acceptors of the photoreceptor system of the PS2 system, the establishment of the photoinduced pH gradient in the chloroplasts (massive entry of the $Mg^{2+}$ ion into the stroma in exchange for protons) etc. When the functional state of the photosynthetic membranes degrades under the influence of certain unfavourable environmental stresses, such as heat, cold or the mineral supply for example, the change of the photosynthetic processes is reflected in the curves of the induction of fluorescence of the chlorophyll. It has therefore been suggested to use certain parameters determined from the fluorescence curves to detect the "stress" conditions of the plants.

The invention concerns a process for treatment of chlorophyllous plants. This process is characterized in that foliated parts of the plants are contacted with an aqueous solution of magnesium hydrogen carbonate, in order to stimulate and/or restore the photosynthetic activity of said plants.

According to one particular method of using the invention, the foliated parts of the plants are treated by spraying with the aid of an aqueous solution of magnesium hydrogen carbonate. It is necessary to ensure that the aqueous solution of magnesium hydrogen carbonate is sufficiently dilute, that is to say that it contains less than 80 g/l, preferably about 20 g/l of magnesium hydrogen carbonate.

The process of treatment of plants is even more effective when the composition also contains at least one trace element selected from manganese, copper, zinc, boron, molybdenum and iron.

This or these trace elements are generally added in the form of carbonates, sulphates, nitrates or chlorides.

In one particular method of using the invention, copper sulphate or ferrous chloride are added.

The treatment according to the invention accelerates the photosynthetic process of all plants, both ligneous and herbaceous. It promotes the photosynthesis of chlorophyllous plants and combats their magnesium deficiencies.

Surface-active products are advantageously added to the solution to improve the penetration of a compound or compounds through the leaves or the needles of the said plants.

Tests have enabled the discovery that a composition prepared extemporaneously from an aqueous solution of magnesium hydrogen carbonate $Mg(HCO_3)_2$ can be used as activator and/or reviver of the photosynthetic activity of the chlorophyllous plants.

According to one feature of the invention, the use of the above-mentioned composition as activator and/or reviver of the photosynthetic activity occurs by contact with the leaves. To this end, the composition contains less than 80 g/l, preferably about 20 g/l, of magnesium hydrogen carbonate.

The above-mentioned composition can also be used for the treatment of plants attacked by magnesium deficiency or as complementary magnesium fertilizing agent.

The invention also relates to a process for preparing extemporaneously a composition for the treatment of plants, containing an aqueous solution of magnesium hydrogen carbonate of formula $Mg(HCO_3)_2$, according to which magnesium oxide pure artificial magnesium oxide of high reactivity, prepared by calcinating hydromagnesite at about 600° C. or by calcinating magnesium hydroxide at about 450° C., so as described in the book of Paul PASCAL, "Nouveau traité de chimie minérale" Vol IV, 1958, Ed. MASSON and Cie, pages 162 and 234, and mixed into water in a reactor so as to obtain a suspension, and the suspension thus obtained is treated with gaseous carbon dioxide at a temperature below 40° C. and under a pressure of carbon dioxide above $5.10^5$ Pa (5 bars). The process is characterized in that plants are contacted with an aqueous solution of magnesium hydrogen carbonate of formula $Mg(HCO_3)_2$, in order to activate and/or restore the photosynthetic activity of said plants. It is advantageous at the time of use to dilute the filtered solution up to about 80 g/l of dissolved $Mg(HCO_3)_2$ to obtain an aqueous solution ready for use, and preferably to dilute the filtered solution to about 20 g/l of dissolved $Mg(HCO_3)_2$.

In a particular method of realization, cooling is applied and the temperature of the water and the solution is maintained between 0° and 10° C. under a pressure of 5–6 bars in order to reach a concentration of 80 g/l of $Mg(HCO_3)_2$ and ensure the stability of the solution up to the time of its use.

For this purpose an apparatus is used for the preparation of a composition for the treatment of plants according to the invention, comprising:

a tank, in which pure artificial magnesium oxide is dispersed in water;

a carbon dioxide reservoir, under a pressure above $10 \times 10^5$ pascals (10 bars), preferably $20 \times 10^5$ pascals (20 bars);

a principal reactor provided with a means intended for the absorption of carbon dioxide and the conversion of magnesium oxide into magnesium hydrogen carbonate, and conduits intended to convey magnesium oxide in suspension from the tank to the principal reactor and the carbon dioxide from the reservoir to the principal reactor.

This apparatus differs from the already known apparatus, by the feature that it is fixed onto a mobile support in order to make possible the extemporaneous preparation of the solution close to the areas of spraying the dilute solution of $Mg(HCO_3)_2$.

Other features and details of the invention will appear in the following detailed description, making reference to the appended figures.

In these figures, the same reference signs designate identical or analogous elements.

Magnesium hydrogen carbonate is a water-soluble intermediate product formed during the manufacture of basic magnesium carbonate by the Pattinson process, (see GB-A-9102) or by a similar process deriving therefrom (see WO-A-8403490).

The Pattinson process uses as starting material dolomia or magnesite which contains calcium oxide. In order to eliminate the lime, magnesium is diluted by carbonatation in the form of magnesium hydrogen carbonate, which is filtered under $CO_2$-pressure in order to keep hold the insoluble calcium carbonate. After filtration, the magnesium hydrogen carbonate solution under pressure is expanded.

The process described in the document WO-A-8403490 uses as starting material iron-magnesite. So as in the Pattinson-process, the starting magnesite is treated by carbonatation in aqueous solution in order to convert the magnesium into water soluble magnesium hydrogen carbonate under $CO_2$-pressure and iron into insoluble iron carbonate. Elimination of the insoluble compound occurs by filtration under $CO_2$-pressure. After filtration, the magnesium hydrogen carbonate cleared out of iron is expanded.

As soon as the pressure of a solution of magnesium hydrogen carbonate under a pressure of $5.10^5$ to $10.10^5$ pascals is reduced to atmospheric pressure at a temperature below 40° C., a precipitate forms of basic magnesium carbonate of formula $(MgCO_3)_4.Mg(OH)_2.4H_2O$, for which no special property in plant physiology is known.

According to the invention, the solution of magnesium hydrogen carbonate has been diluted before reducing to atmospheric pressure, in order to ensure the chemical stability of the magnesium hydrogen carbonate and to avoid its transformation into basic carbonate.

The special physiological properties of a dilute solution of magnesium hydrogen carbonate are revealed by the following comparative tests.

I. COMPARATIVE TESTS IN GREENHOUSES

During comparative tests, two herbaceous species (barley and maize) were submitted to two regimes of feeding, the one normal (that is to say, with magnesium) and the other without magnesium. The decreases of the photosynthetic activity of normal control plants and of plants deprived of magnesium were followed during the course of the tests by measuring the extinction of the chlorophyllous fluorescence (qQ) and the quantum yield (rQ).

The same tests were carried out in parallel on a ligneous species: the spruce (originating from forests which suffer from symptoms of withering, and showing magnesium deficiencies).

Figure 1:
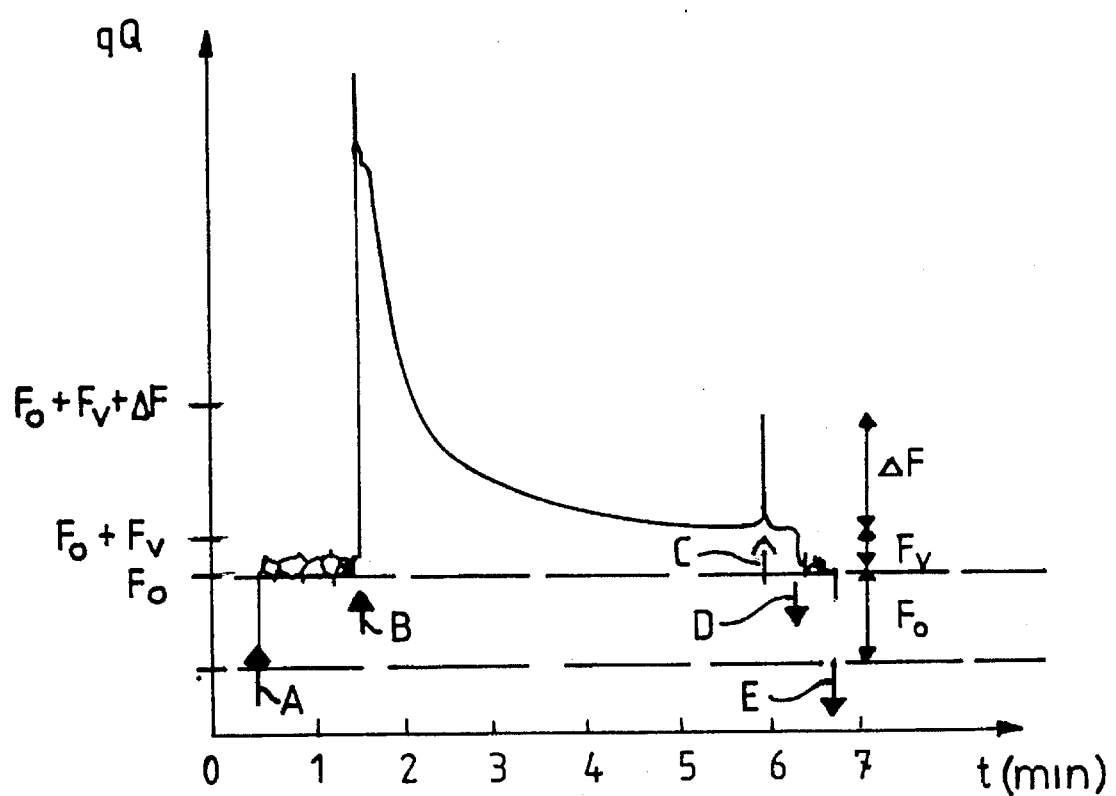
FIG. 1 shows the kinetics as a function of time of the photochemical component of the chlorophyllous fluorescence (qQ) in an unstressed leaf of durum wheat.

The photochemical component of the fluorescence of the chlorophyll (qQ) is determined by means of a PAM 101-102-103 fluorimeter, made by the firm of Waltz (Effeltrich, FRG), employing a modulated fluorescence and an induced fluorescence. An example of a fluorescence curve measured by means of this fluorimeter is shown in FIG. 1. The modulated fluorescence is obtained by brief pulses of red light (1 µs) applied at a frequency of 1.6 kHz. An exciting light (A) of very low intensity (integrated value=0.5 µE/m²/sec), of such a kind that no induction phenomenon is initiated, is produced by a light emitting diode (650 nm). This exciting light (A) enables the initial level of fluorescence $F_o$ to be measured. The induction of the chlorophyllous fluorescence is caused by a second light, white (B), unmodulated and of greater intensity (800 µE/m²/sec) produced by a 150 W halogen lamp (Osram Xenoplot HLX). The induction is measured with a frequency of 110 kHz to strongly reduce the parasitic background noise and appreciably to increase the response time of the apparatus. The maximum level of fluorescence of the chlorophyll is determined by the addition of a flash (1 s) of white light (C) of very high intensity, saturating for the transfer of electrons (8000 µE/m²/sec. In this study the measurements were made at ambient temperature (25 ° C.). The method of calculation used to estimate the photochemical component of extinction of fluorescence, from the initial, stationary and maximum level of fluorescence is explained by FIG. 1. All the photon flux densities are measured with the aid of a Li-Cor 188 B radiometer.

The quantum yield (rQ) is a measure of the efficiency of conversion of luminous energy into chemical energy by photosynthesis. It measures the number of moles of $O_2$ produced (or of $CO_2$ fixed) per molar quantum of the photosynthetically active radiation "PAR" (wavelength between 400 and 700 nm). The measurement of the production of $O_2$ was determined on foliar discs by a Clark electrode of the Hansatech LD2 type. The result of the measurements is represented graphically in FIGS. 2 and 3. The descending shape of the curve reveals the reduction of fluorescence of the chlorophyll in a leaf (unstressed) of durum wheat (var. Clairdoc). A leaf of the plant, after having been adapted to the darkness, was first illuminated with a very weak modulated light A, so as to determine the level 0 of fluorescence ($F_o$). The variable fluorescence ($F_v$) was induced by means of a second light (unmodulated and of greater intensity), lit at B and extinguished at C. The addition of a saturating flash of light C induced an increase of fluorescence ($\Delta F$) to the maximum level. From the values of $F_o$, $F_v$ and $\Delta F$ it was possible to calculate qQ by using the following formula:

$$qQ=\Delta F/(\Delta F+F_v).$$

TABLE 1

Results of the measurements of quantum yield (rQ) on plants not deprived of magnesium (controls) and deprived plants. The standard deviations are given in brackets.

| Plants | Controls | Deprived |
|---|---|---|
| Barley | 0.57 (±0.04) | 0.27 (±0.03) |
| Maize | 0.55 (±0.07) | 0.22 (±0.02) |
| Spruce | 0.52 (±0.02) | 0.11 (±0.02) |

Table 1 shows a large reduction (about 55% of the control) of the production of $O_2$ from the plants deprived of magnesium, indicating a large inhibition of the photosynthetic activity, probably due to a change of the photochemical processes of the chloroplasts as a result of the deficiency of magnesium.

Figure 2:
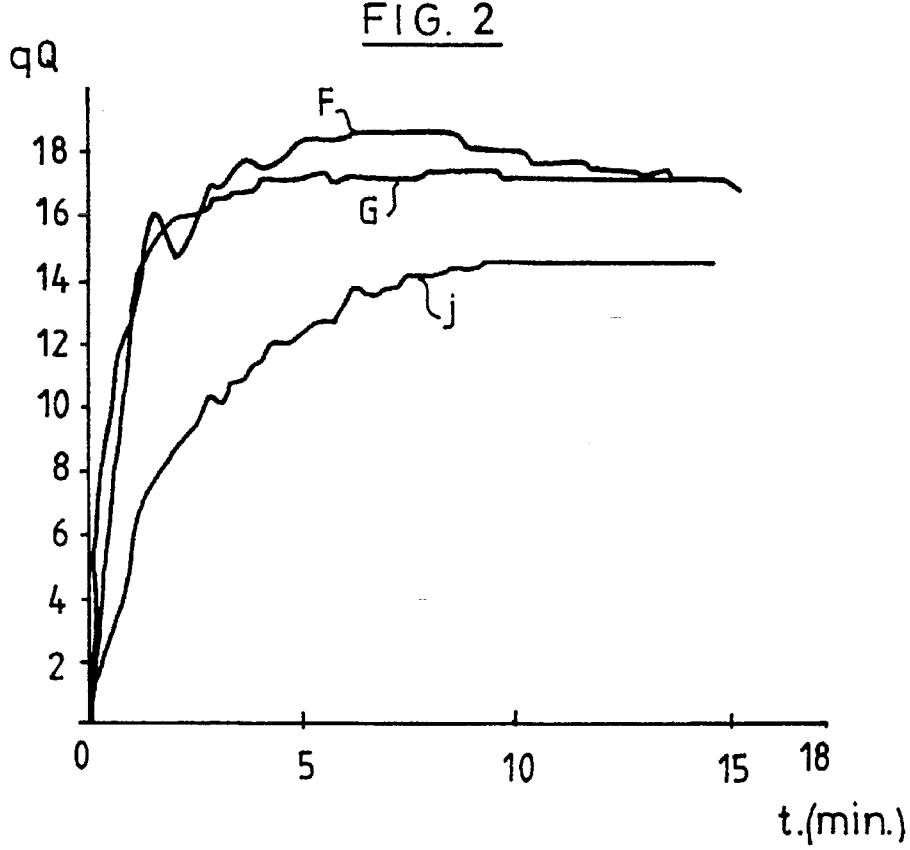
FIG. 2 shows the development of the photochemical component (qQ) of the extinction of the chlorophyllous fluorescence on light induction, on winter wheat, after application of $Mg(HCO_3)_2$.

FIG. 2 shows the development of the photochemical component (qQ) of the extinction of the chlorophyllous fluorescence on light induction, during the course of time on winter wheat, after application of $Mg(HCO_3)_2$ on control plants F which have received a nutritive solution containing magnesium, on deprived plants G which have received a nutritive solution free of magnesium, and on treated plants J which have received a nutritive solution free of magnesium but been treated by foliar spray with an aqueous solution containing 20 g/l of magnesium hydrogen carbonate.

Figure 3:
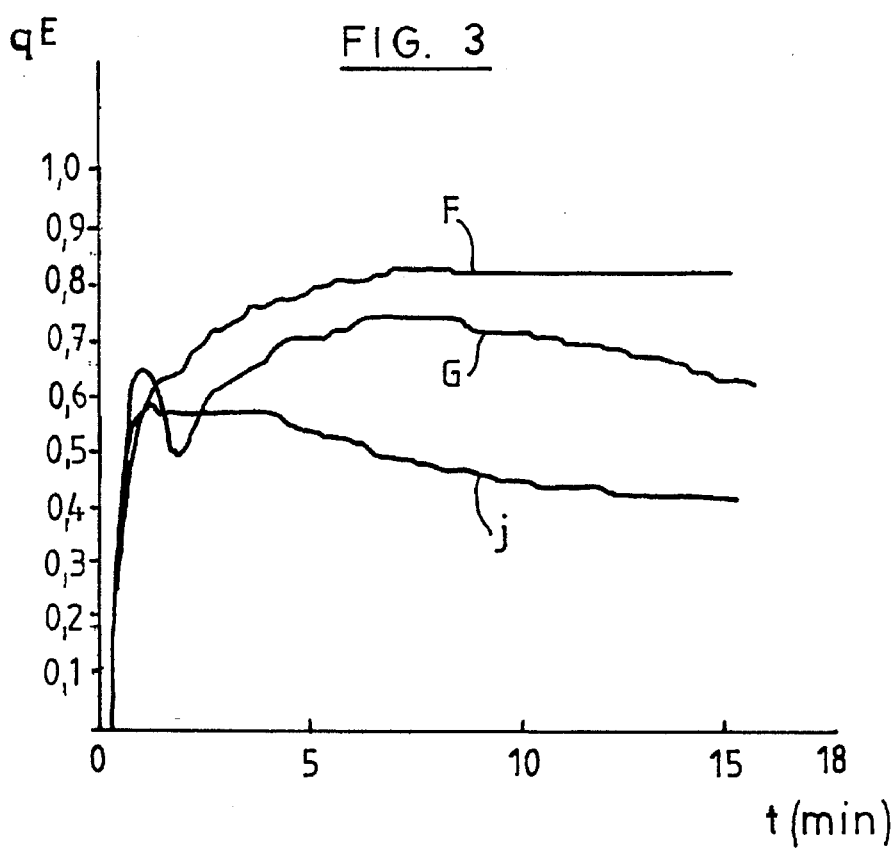
FIG. 3 shows the development of the energy component (qE) of the extinction of the chlorophyllous fluorescence on light induction, on winter wheat, after application of $Mg(HCO_3)_2$.

FIG. 3 shows the development of the energy component (qE) of the extinction of chlorophyllous fluorescence on induction at the end of 6 days of treatment on winter wheat.

TABLE 2

Results of measurements of photochemical extinction of the fluorescence of chlorophyll (qQ) on plants not deprived of magnesium (controls) and deprived plants. The standard deviations are given in brackets.

| Plants | Controls | Deprived |
|---|---|---|
| Barley | 0.91 (±0.08) | 0.57 (±0.13) |
| Maize | 0.89 (±0.07) | 0.52 (±0.05) |
| Spruce | 0.92 (±0.05) | 0.51 (±0.08) |

Table 2 indicates a strong inhibition of the reoxidation of the primary receptors of the PS2 photoreceptor system. These results reveal important changes in the ultrastructure of the chloroplasts. Chevalier and Huguet (1975), when studying the effects of magnesium deficiency on the ultrastructure of the chloroplasts of apple tree leaves, observed that a feed inadequate in magnesium leads to a deformation of the lamellar structure of the chloroplasts. Visibly, magnesium is a stabilizing element of the thylakoid membranes of the chloroplasts. Now this lamellar structure is very important in the structural organization of the electron transfer chain.

Figure 4:
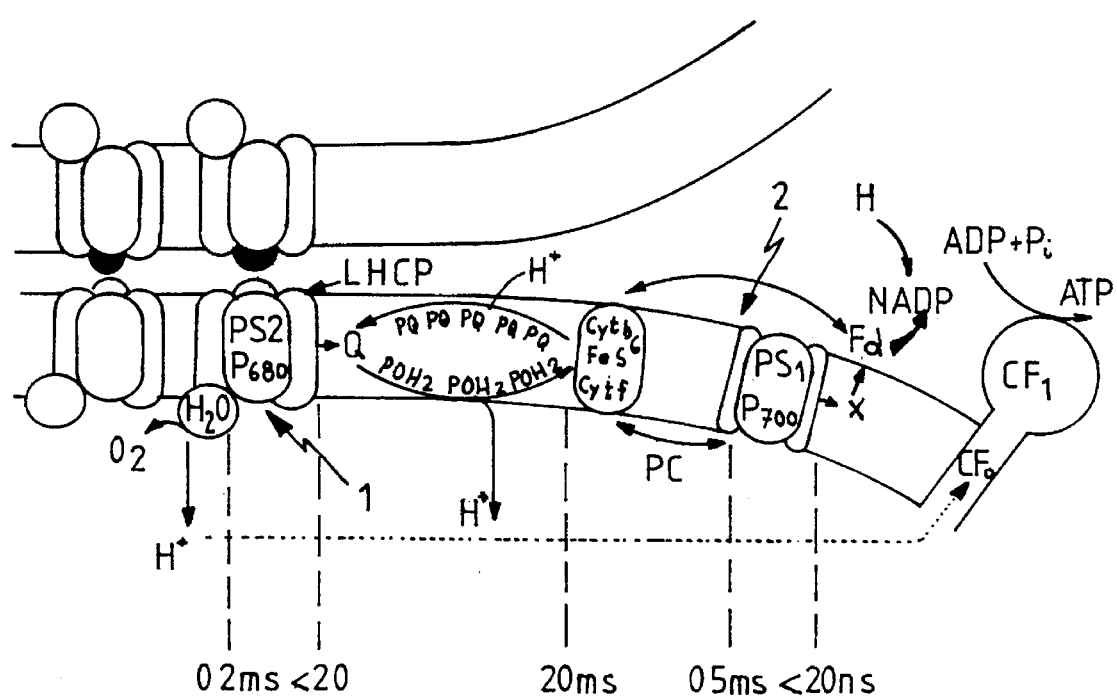
FIG. 4 shows the spatial structure of the constituents of a photosynthetic system in the membranes.

FIG. 4 shows the spatial organization of the components of the photosynthetic system in the thylakoid membranes composed of three types of chloroprotein complexes such as represented in a publication by Anderson and Anderson in 1982.

These types of complexes above-mentioned are:
the LHCP complex (Light Harvesting Chlorophyll Protein complex);
the PS1 photoreceptor system, which is a photosystem characterized by the trap pigment P 700;
the PS2 photoreceptor system, which is a photosystem characterized by the trap pigment P 680.

The junction between the PS2 and the PS1 is realized by a chain of electron carriers composed of quinones (Q), plastoquinones (PQ), cytochromes (Cyt) and plastocyanines (Pc).

FIG. 4 shows that the PS2 photoreceptor systems are confined to the stacked zones 1, while all the PS1 photoreceptor systems are situated in the non-stacked zones 2 of the thylakoid membranes; the disorganization of this arrangement therefore leads to an inhibition of the electron transfer in the chain and therefore an inhibition of the photosynthetic activity of the plant. Thomson and Weir (1962) observed in *Phaseolus vulgaris* deprived of magnesium a reduction of the number of the grana and a reduction or total absence of their compartmentation. They oberved also an accumulation of grains of starch.

The maize and barley were cultivated in cylindrical pots, 25 cm in diameter and 70 cm high on inert substrate (quartz) and, to induce the deficiency, were supplied with a nutritive solution without magnesium, whose composition was the following:

| | |
|---|---|
| $Ca(NO_3)_2 \cdot 4H_2O$ | 23.17 g |
| $KNO_3$ | 12.57 g |
| $K_2HPO_4$ | 9 g |
| $K_2SO_4$ | 4.57 g |
| Trace elements | iron chelate<br>copper sulphate<br>zinc sulphate<br>manganese sulphate<br>boric acid<br>ammonium heptamolybdate in quantity covering the requirements of the cultivation. |

Twenty-five pots were taken and divided into five rows, and five grains of maize were planted in each pot. The first row was supplied with a complete nutritive solution with magnesium, and the four other rows were supplied with a nutritive solution without magnesium.

At the 6-leaves stage a foliar spraying was carried out:
with distilled water on the second row (deficiency);
with a solution of $Mg(HCO_3)_2$ at the dose of 8 kg/ha (about 2 ml/plant) on the third row;
with $MgCl_2$ on the fourth row; and
with $NaHCO_3$ on the fifth row.

The first row, supplied normally with magnesium, served as control.

Figure 5:
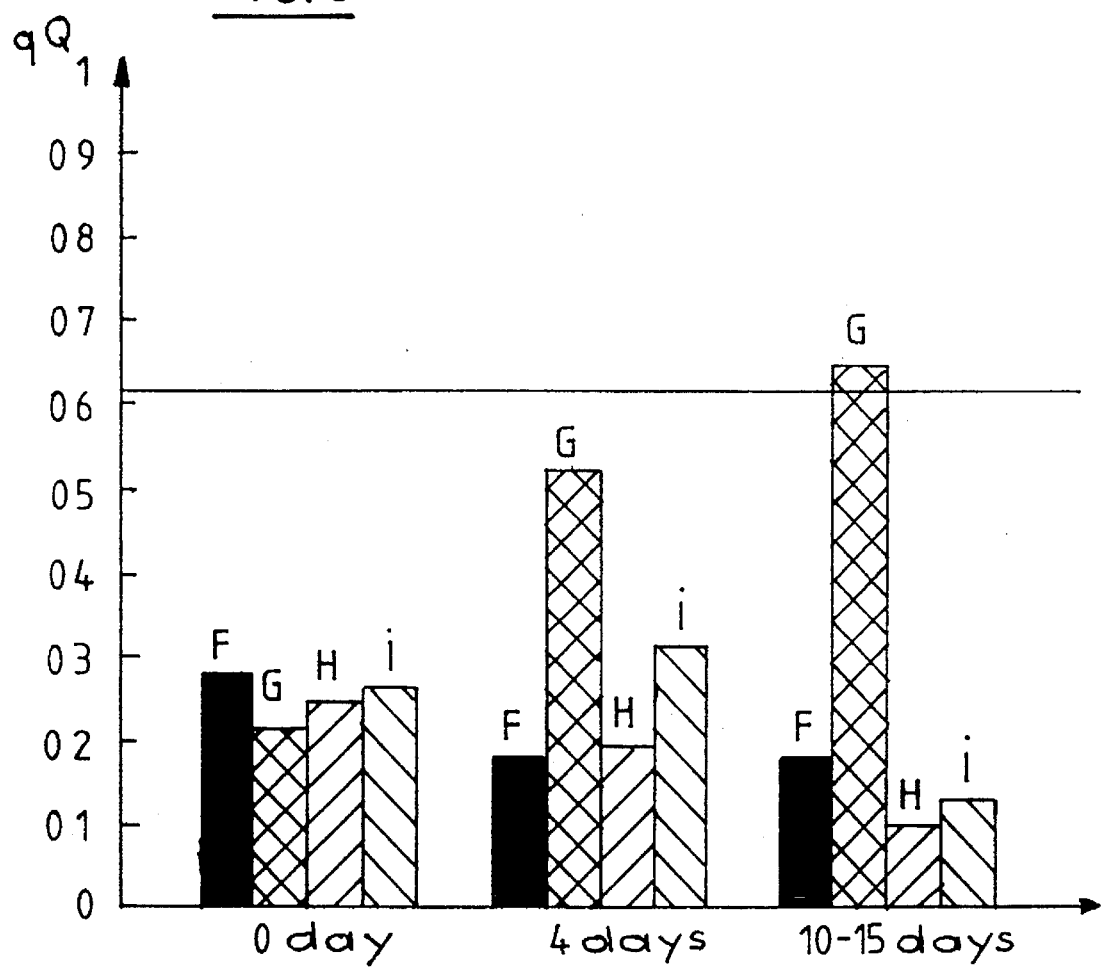
FIG. 5 represents the development of the quantum yield (rQ) of the photosynthesis on maize at the 6-leaf stage, after different experimental treatments.

Measurements of quantum yield (rQ) and chlorophyllous fluorescence (qQ) were carried out on four rows of maize plants deprived of magnesium, the first (F) untreated, the second (G) treated by foliar spraying with a solution containing 20 g/l of magnesium hydrogen carbonate, the third sprayed with a solution of magnesium chloride, and the fourth sprayed with a solution of sodium hydrogen carbonate. The results are those measured 0, 4 and 10–15 days after foliar spraying. FIG. 5 illustrates the increase of quantum yield in the time interval.

Figure 6:
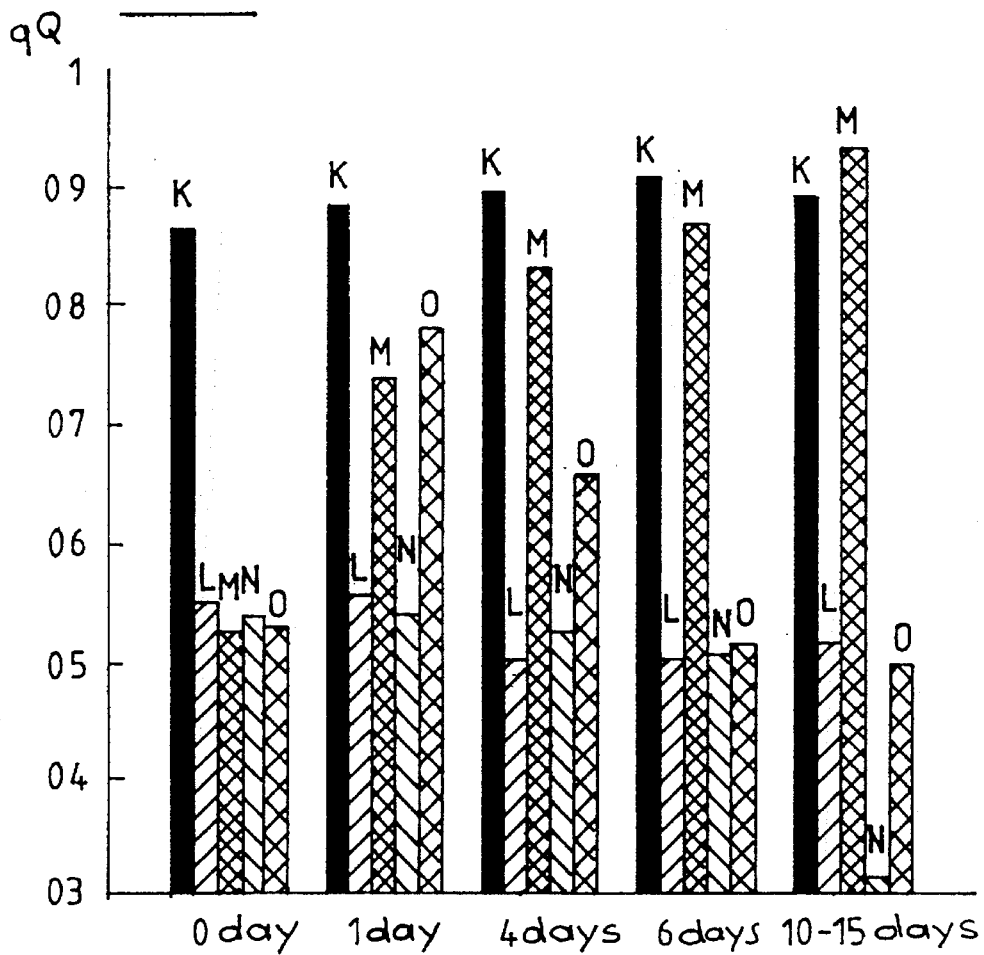
FIG. 6 represents the development of the photochemical component of the extinction of the chlorophyllous fluorescence (qQ) immediately after the light induction, on maize at the 6-leaf stage, after application of the same experimental treatments.

Measurements of the photochemical component (qQ) were carried out 0, 1, 4, 6 and 10–15 days after spraying on She untreated control plants (K) and on the four rows of maize plants deprived of magnesium, the first (L) untreated, the second (M) treated by foliar spraying with an aqueous solution containing 20 g/l of magnesium hydrogen carbonate, the third (N) sprayed with a solution of magnesium chloride and the fourth (O) sprayed with an aqueous solution of 20 g/l of sodium hydrogen carbonate (FIG. 6). This figure shows that on the sixth day the plants treated with the $Mg(HCO_3)_2$ solution have already recovered a photosynthetic activity close to that of the non-deprived control plants and that after 15 days this activity is even greater than that of the control plants provided normally with magnesium.

visually, and after only four days, a spectacular disappearance of the visible symptoms of the magnesium deficiency (disappearance of the yellow-green striae between the veins) is observed in the plants treated with $Mg(HCO_3)_2$. This shows that there has been an extremely rapid penetration into the treated leaves of magnesium in the form of hydrogen carbonate and a reestablishment of the functional structure of the chloroplasts. With the treatment with magnesium chloride $MgCl_2$, on the fourth day the appearance of necrosis was observed on the treated leaves. Magnesium chloride is phytotoxic in foliar spraying. With the $NaHCO_3$ treatment, for the quantum yield a transient stimulation of the treated plants during the first days is noted: this is due solely to the intrafoliar supply of $CO_2$ liberated by the sodium hydrogen carbonate.

Liberation of $CO_2$ in the leaf from $Mg(HCO_3)_2$

The technique consists of containing a foliar disc in a chamber in which the circulating flow of air is controlled. The carbon dioxide $CO_2$ of the air can be suppressed with the aid of a column of caustic soda (NaOH) and the photosynthetic activity is followed by measurement of the chlorophyllous fluorescence (qQ). The suppression of the $CO_2$ of the air leads to an inhibition of the fixation of $CO_2$, the consequence of which is a reduction of the chlorophyllous fluorescence. Three series of measurements of qQ were carried out:

on the control foliar discs in presence of $CO_2$;
on the control foliar discs in the absence of $CO_2$; and
on the foliar discs treated by spraying with $Mg(HCO_3)_2$ in the absence of $CO_2$.

The foliar discs were cut in barley leaves (at the 2-leaf stage).

Figure 7:
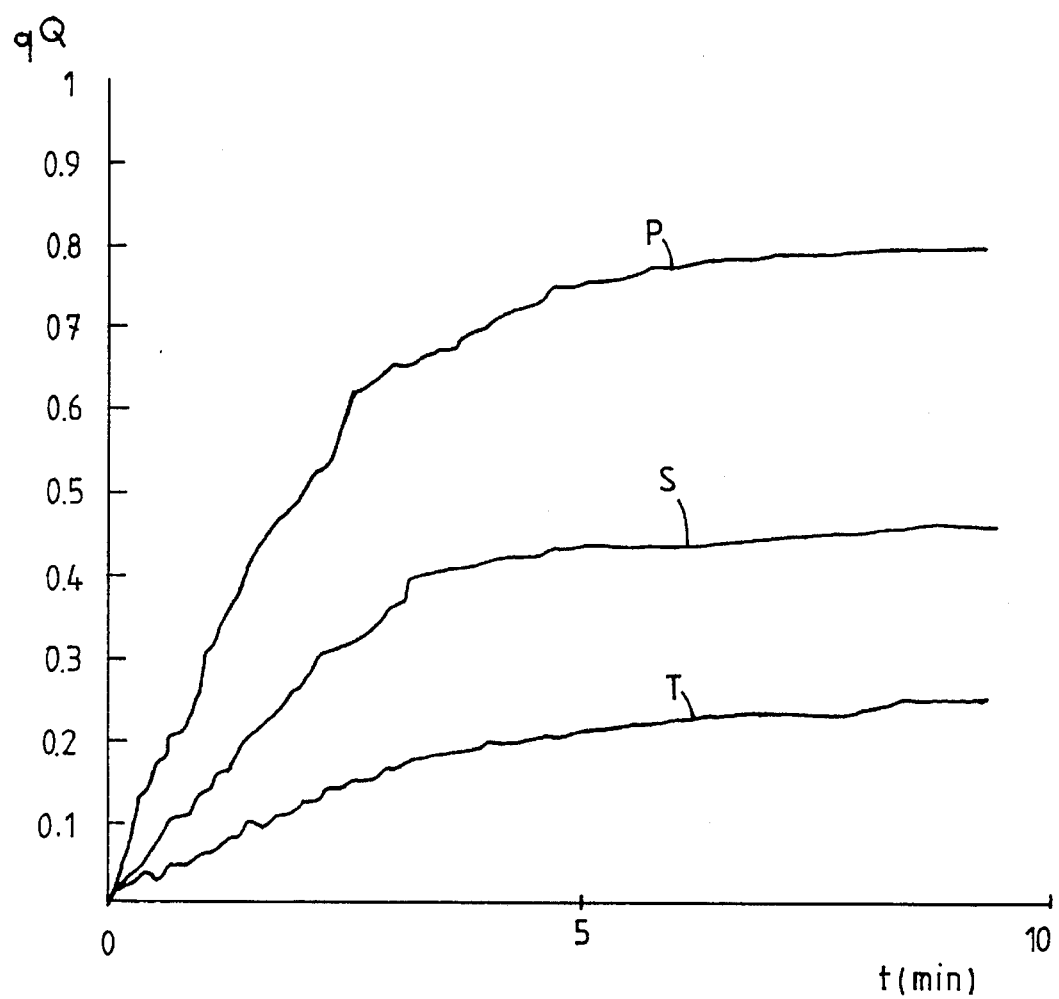
FIG. 7 represents the development of the photochemical component of the extinction of the modulated chlorophyllous fluorescence (qQ relative) in the course of time.

The development of the photochemical component of the extinction of the chlorophyll fluorescence immediately after the induction of light is illustrated in FIG. 7. The control curve (marked P) corresponds to a test during which the $CO_2$ is not removed from the air circulating in the chamber. The curve relating to the treated barley (marked T) corresponds to a test during which the $CO_2$ is removed from the air by absorption on a column of caustic soda.

FIG. 7 shows that in the absence of $CO_2$ from the air, the perturbation of the chlorophyllous fluorescence qQ in the course of time is much less for the treated discs (curve S) than for the control discs (curve T). The restoration of qQ for the treated discs (curve S) can only be explained by an intrafoliar liberation of $CO_2$ by the $Mg(HCO_3)_2$. This intrafoliar liberation of $CO_2$ would play a stimulating role for the deprived plants treated with $Mg(HCO_3)_2$, permitting an acceleration of the reestablishment of the photosynthetic activity observed in the preceding tests.

Treatment of young spruces affected by withering symptoms attributed to the action of "acid rain"

Young individuals originating from spruce plantations affected by withering symptoms and showing signs of magnesium deficiencies were used for this test. The spruces were potted on in the soil from which they had been taken and sprayed with distilled water. Half of these trees U were sprayed with a composition according to the invention at the dose of 8 kg/ha (2 ml/plant), and the other half V served as controls. Measurements of the chlorophyllous fluorescence (qQ) were carried out 0, 1, 4 and 150 days after the foliar spraying.

Figure 8:
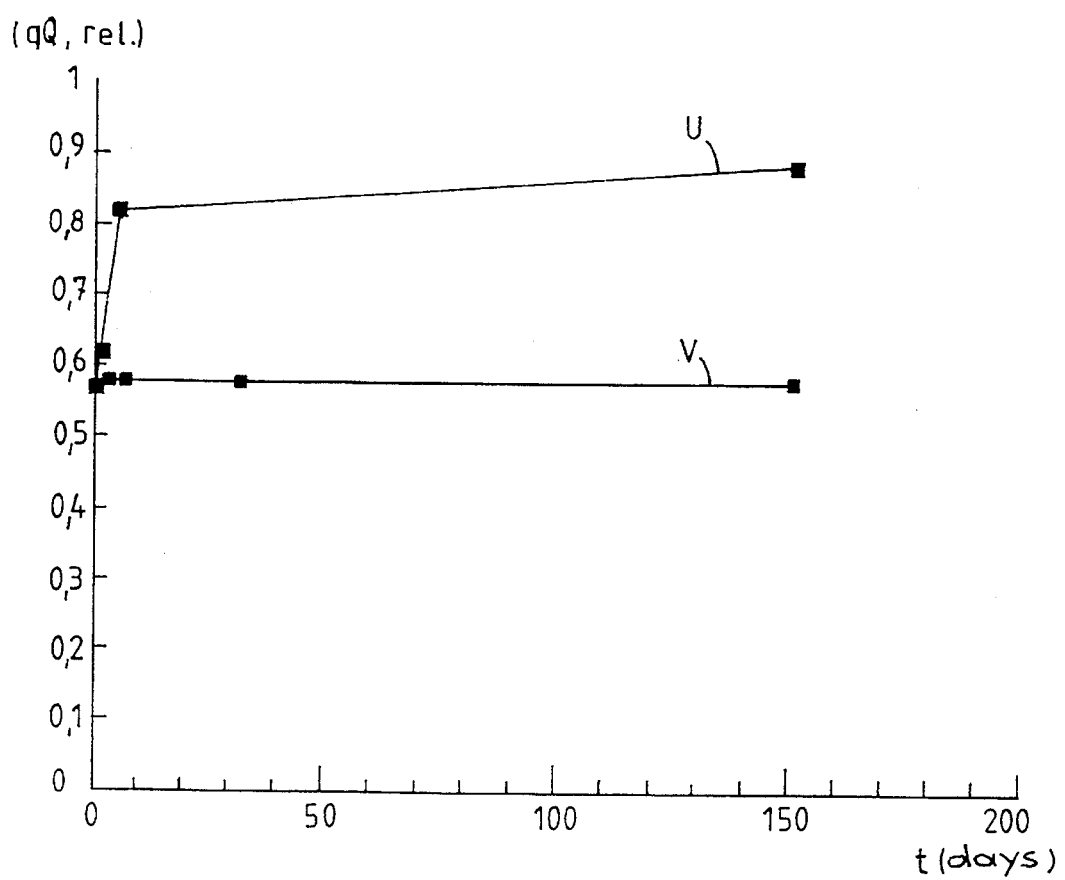
FIG. 8 illustrates the development of the photochemical component of the extinction of the fluorescence of chlorophyll on the induction (qQ rel.), 0, 1, 4 and 150 days after the spraying of a solution of $Mg(HCO_3)_2$ on treated spruce compared with that of a control spruce, showing symptoms of withering.

The results are shown in the form of a graph in FIG. 8. The control test represented by the line V reveals a relatively constant modulated fluorescence, while the test on the specimens of young spruces attacked by "acid rain" and treated with a solution of magnesium hydrogen carbonate is represented by the line U. The line E shows a reestablishment of the photosynthetic activity seven days after the treatment with the aid of the solution mentioned. Visually, the needles of the treated trees recover a dark green colour after only four days. This indicates that in the case of spruce needles the penetration of the magnesium in the "$Mg(HCO_3)_2$" form is very rapid. After four months of treatment the production of young shoots was observed, and at the fifth month these shoots had reached a length of 10 to 15 cm. This indicates an effective and spectacular reestablishment of these young spruces, while the control trees had not formed shoots or had formed extremely short shoots which scarcely exceeded 1 cm in length and had rapidly acquired a yellow colour.

II. COMPARATIVE TRIALS IN THE OPEN FIELDS

The results of the following comparative trials are expressed in the form of tables 1) Trials on winter wheat (Camp Rémy variety) carried out at Liberchies Characteristics of the soil:

| | | |
|---|---|---|
| P content (mg/100 g) | 11 | high |
| K content (mg/100 g) | 11 | medium |
| Mg content (mg/100 g) | 8.3 | medium |
| Ca content (mg/100 g | 245 | very high |
| C content (%) | 0.61 | low |
| N content (%) | 0.113 | |
| Fe content (ppm) | 105 | medium |
| Cu content (ppm) | 3.9 | medium |
| Mn content (ppm) | 37 | low |
| Zn content (ppm) | 7 | medium |
| pH KCl | 7.7 | high |

The trials are repeated four times. Trial no. 1 relates to control plants in the absence of any foliar spraying of a magnesium hydrogen carbonate composition.

Trial no. 2 relates to plants treated by foliar spraying of an acidic magnesium composition at the rate of 3 kg Mg/ha (that is to say 5 liters of an aqueous solution containing 25 g/l of $Mg(HCO_3)_2$ or 7.15 g/l of magnesium per unit plot of 120 m$^2$).

The treatment was carried out at the last leaf stage so as to prolong and stimulate the photosynthetic activity and ensure an improved filling with grain in the absence of the phenomena of shrivelling by the sun.

Experimental results:

| Treatment | yield at 14% humidity kg/ha | % control | Specific gravity of wheat kg/hl | % control | Increase/ control kg/ha |
|---|---|---|---|---|---|
| Trial no. 1 Control | | | | | |
| 1 | 8260 | | 76.8 | | |
| 2 | 7980 | | 73.3 | | |
| 3 | 7870 | | 76.0 | | |
| 4 | 8460 | | 74.9 | | |
| Mean | 8143 | 100.0 | 75.3 | 100.0 | 0 |
| Standard deviation | 268 | | 1.5 | | |
| Trial no. 2 $Mg(HCO_3)_2$ | | | | | |
| 1 | 8330 | | 74.1 | | |
| 2 | 8520 | | 76.2 | | |
| 3 | 8410 | | 74.2 | | |
| 4 | 8670 | | 76.5 | | |
| Mean | 8483 | 104.2 | 75.3 | 100.0 | 340 |
| Standard deviation | 147 | | 1.3 | | |

Following the application of $Mg(HCO_3)_2$, applied at the last leaf stage, the increase of yield is 4.2%, that is to say a gain compared with the control of 340 kg/ha.

An application at the full tillering stage could also turn out to be beneficial.

The analysis of the variance by 2 criteria shows:

1) the absence of a block effect
2) a treatment effect which is probably significant (the risk of error of the first kind α is 6%)

The increase of yields occurs without loss of specific gravity.

2) Trials on the cultivation of potatoes (Bintje variety) at Frasne-lez-Anvaing (Arc-Ainiéres)

Experimental treatments

The trials are repeated four times. Trial no. 1 relates to control plants without foliar spraying of a magnesium hydrogen carbonate composition. Trial no. 2 relates to potato plants treated by foliar spraying with a magnesium hydrogen carbonate composition at the rate of 3.5 kg Mg/ha (that is to say 6 liters of an aqueous solution containing 25 g/l of $Mg(HCO_3)_2$ or 7.15 g/l of magnesium per unit plot of 120 m$^2$). The application is made at the stage of elongation of the stalks.

Experimental results:

| Treatment | Yield before drying $10^3 \times$ kg/ha | % of control | Percentage dry matter (%) | % of control | Yield of dry matter kg/ha | % of control |
|---|---|---|---|---|---|---|
| Trial 1 Control | | | | | | |
| 1 | 58.82 | | 16.9 | | 9941 | |
| 2 | 68.34 | | 16.8 | | 11451 | |
| 3 | 65.28 | | 18.7 | | 12207 | |
| 4 | 78.16 | | 18.6 | | 14166 | |
| Mean | 67.15 | 100.0 | 17.8 | 100.0 | 11949 | 100.0 |
| Standard deviation | 7.20 | | | | 1757 | |
| Trial 2 $Mg(HCO_3)_2$ | | | | | | |
| 1 | 66.30 | | 18.5 | | 12266 | |
| 2 | 81.94 | | 18.5 | | 15159 | |
| 3 | 65.62 | | 17.9 | | 11746 | |
| 4 | 82.62 | | 18.4 | | 15202 | |
| Mean | 74.12 | 110.4 | 18.3 | 103.3 | 13593 | 113.8 |
| Standard deviation | 9.43 | | | | 1756 | |

A single application of magnesium hydrogen carbonate at the stage of rapid growth of the plant has led to an increase of the yield before drying of 10.4%—that is to say an increase relative to the control of 6.97×10$^3$ kg/ha.

An analysis of the variance by two criteria has shown:

1) the existence of a probably significant block effect (α=6%),
2) the existence of a probably significant effect of treatment (α=8%).

The increase of the percentage of dry matter by comparison with the control is 3.3%. This is advantageous if the product is intended for industrial conversion.

The increase of the yield of dry matter by comparison with the untreated control is 13.8%.

3) Trials on the cultivation of forage maize (KEO variety at Frasne-lez-Anvaing (Arc-Ainiéres)

Experimental treatments

The trials were repeated four times. Trial no. 1 relates to control maize plants in the absence of any foliar spraying of a magnesium hydrogen carbonate composition. Trial no. 2 relates to maize plants treated by foliar spraying with a magnesium hydrogen carbonate composition at the rate of 3.5 kg Mg/ha (that is to say 6 liters of an aqueous solution containing 25 g/l of $Mg(HCO_3)_2$ or 7.15 g/l of magnesium per unit plot of 120 m$^2$).

The application was made at the 5–6-leaf stage, at the time when the young plant starts its period of rapid growth. It is obvious that at this stage interception by the foliage is not optimal and that a non-negligible part of the product falls on the ground.

The plot adjoins the plot planted with potatoes, which was the subject of the trials reported under 2) above. The contents of exchangeable nutritive elements and the pH are in order and no magnesium deficiency originating from the soil was determined.

Experimental results:

| Treatment | Yield of green matter $10^3 \times$ kg/ha | % of control | Dry matter (%) | % of control | Yield of dry matter kg/ha | % of control |
|---|---|---|---|---|---|---|
| Trial 1 Control | | | | | | |
| 1 | 78.75 | | 18.3 | | 14441 | |
| 2 | 71.75 | | 17.5 | | 12556 | |
| 3 | 89.25 | | 18.7 | | 16690 | |
| 4 | 86.62 | | 18.7 | | 16198 | |
| Mean | 81.59 | 100.0 | 18.3 | 100.0 | 14971 | 100.0 |
| Standard deviation | 4.85 | | | | 821 | |

-continued

| Treatment | Yield of green matter | | Dry matter | | Yield of dry matter | |
|---|---|---|---|---|---|---|
| | $10^3 \times$ kg/ha | % of control | (%) | % of control | kg/ha | % of control |
| Trial 2 $Mg(HCO_3)_2$ | | | | | | |
| 1 | 81.38 | | 18.7 | | 15218 | |
| 2 | 75.25 | | 19.5 | | 14674 | |
| 3 | 86.63 | | 18.6 | | 16113 | |
| 4 | 83.85 | | 19.6 | | 16435 | |
| Mean | 81.78 | 100.2 | 19.1 | 104.4 | 15610 | 104.3 |
| Standard deviation | 7.93 | | | | 821 | |

Although there is no significant difference for the production of green matter, a probably significant difference for the percentage of dry matter ($\alpha=7\%$) leads to a probably significant increase of the yield of dry matter ($\alpha=9\%$) of 4.3% by comparison with the control, that is to say of 639 kg of dry matter per hectare.

The higher percentage of dry matter allows the presumption of an improved protein and energy value of the product.

An increase of the magnesium contents of the forage is also observed, whereas the forage is very often deficient in this element.

4) Trials on the cultivation of the sugar beet (Allyx variety) at Frasnes-lez-Anvaing (Montroeul-au-Bois)
Characteristics of the soil

| P content (mg/100 g) | 12 | high |
|---|---|---|
| K content (mg/100 g) | 17 | high |
| Mg content (mg/100 g) | 5.1 | low |
| Ca content (mg/100 g) | 350 | very high |
| C content (%) | 1.15 | medium |
| N content (%) | 0.089 | |
| Fe content (ppm) | 115 | medium |
| Cu content (ppm) | 3.6 | medium |
| Mn content (ppm) | 36 | low |
| Zn content (ppm) | 10 | medium |
| pH KCl | 7.6 | high |

Experimental treatments:
The trials are carried out without repetition. Trial no. 1 relates to the control plants in the absence of any spraying of a magnesium hydrogen carbonate composition. Trials nos. 2, 3 and 4 relate to sugar beet plants subjected to one, two and three foliar sprayings respectively of a composition of magnesium hydrogen carbonate.

The magnesium dose is theoretical. The product is applied in the pure state without taking account of the percentage of precipitation. The application is carried out at the 10–12 leaf stage before the topping.
Experimental results

| Dose kg Mg/ha | Yield of roots | | Total sugars % | | Yield of sugar | |
|---|---|---|---|---|---|---|
| | T/ha | % control | (%) | % control | kg/ha | % control |
| Trial 1 | | | | | | |
| 0 kg/ha | 58.28 | 100.0 | 16.1 | 100.0 | 9382 | 100.0 |
| Trial 2 | | | | | | |
| 1 kg/ha | 55.13 | 94.6 | 16.3 | 101.2 | 8936 | 95.8 |
| Trial 3 | | | | | | |
| 2 kg/ha | 60.30 | 103.5 | 16.2 | 100.6 | 9769 | 104.1 |
| Trial 4 | | | | | | |
| 3 kg/ha | 72.00 | 123.5 | 16.5 | 102.5 | 11880 | 126.6 |

Figure 9:
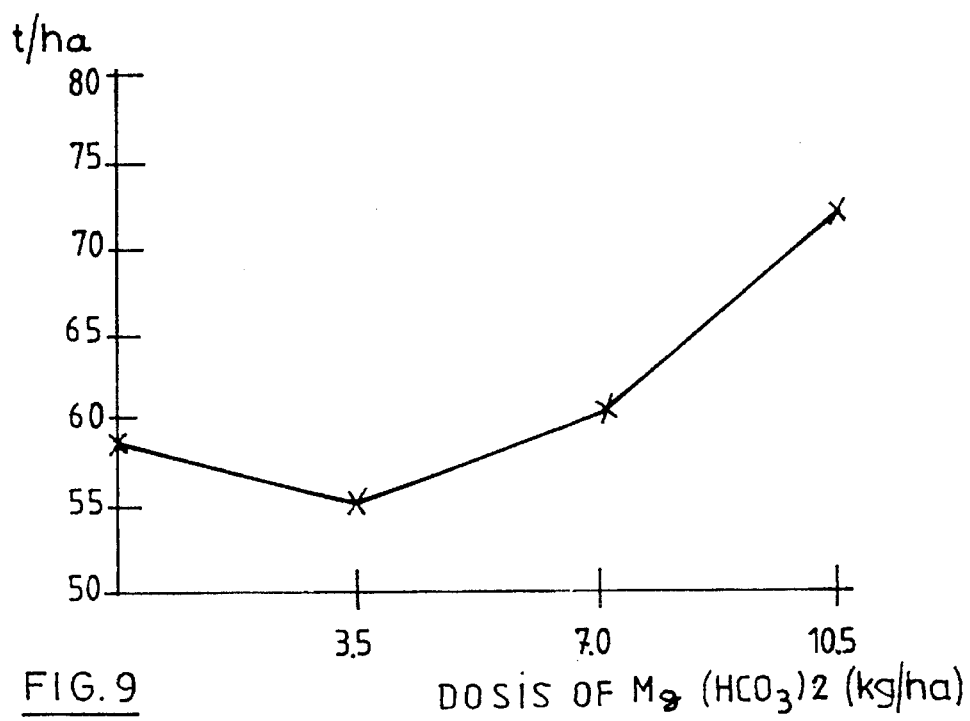
FIG. 9 shows the development of the yield of the roots of the sugar beet (T/ha) as a function of the application of increasing doses of magnesium hydrogen carbonate.

At the low application dose, the root yield suffers a probably non-significant depressing effect by comparison with the control. It is only beyond a certain dose that the differences show themselves, and especially at 10.5 kg $Mg(HCO_3)_2$/ha, corresponding to 3 kg Mg/ha, with a substantial increase of 23.5%. FIG. 9 illustrates the development of the yield of roots as a function of the dose of magnesium applied in the form of $Mg(HCO_3)_2$.

Figure 10:
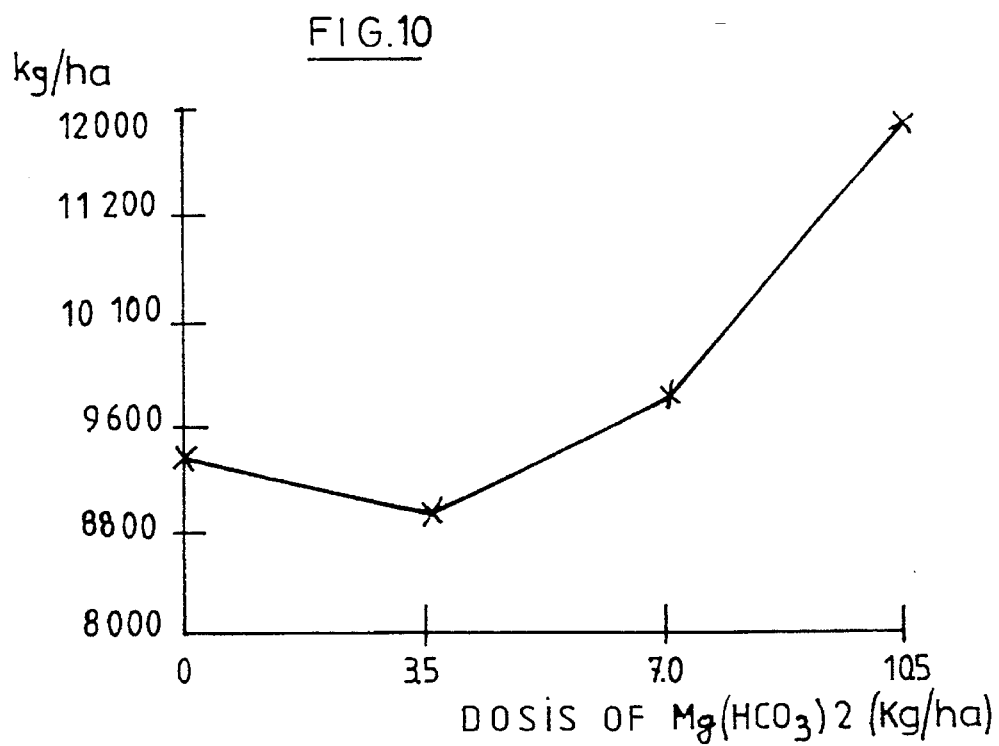
FIG. 10 shows the development of the yield of sugar (kg/ha) from sugar beets treated with the aid of $Mg(HCO_3)_2$ as a function of the application of increasing doses of $Mg(HCO_3)_2$.

FIG. 10 shows that the yield of sugar per hectare increases with the application of increasing doses of the product. This yield of sugar per hectare undergoes a still greater increase than the yield of roots: 26.6% at the application dose of 10.5 kg $Mg(HCO_3)_2$/ha (theoretical dose of 3 kg Mg/ha).

The physiological studies carried out in the laboratory confirm an extremely rapid action of the composition containing magnesium hydrogen carbonate on deprived plants. They also confirm a total reestablishment of the photosynthetic activity after only four to six days of treatment, and as a matter of fact for maize, wheat and the young spruces.

The long-term action of magnesium hydrogen carbonate is confirmed by the fact that the young spruces have recovered and kept a normal activity even after 5 months of treatment. But for the ligneous plants a much longer time, probably two to three years, is necessary to judge total cure.

The exploratory agronomic studies carried out in the field on winter wheat, potato, forage maize and sugar beet have shown that $Mg(HCO_3)_2$ is a product which, optimally adjusted and well targeted phytotechnically, offers important prospects of agronomic valorization.

The present invention also relates to a process for preparing a composition for the treatment of plants containing an aqueous solution of magnesium hydrogen carbonate $Mg(HCO_3)_2$.

According to this process, pure magnesium oxide of high reactivity in regard to carbon dioxide and water are mixed in a reactor to obtain a suspension, and the suspension thus obtained is treated with gaseous carbon dioxide under pressure at a temperature below 40° C., preferably at a temperature of about 10° C., and under a partial pressure of carbon dioxide above $5 \times 10^5$ pascals (5 bars).

This process step has certain similarities to the process described in the document WO-A-8403490 relating to the preparation of magnesium carbonate trihydrate and basic magnesium carbonate. However, instead of using iron dolomite or magnesite as raw material, produced by calcination at elevated temperature, t.m. above 800° C., pure artificial magnesium oxide is used in the process according to the invention, said magnesium oxide being produced in the form of a finely divided pulver having a high reactivity in regard to $CO_2$ and a specific surface comprised between 80 and 200 $m^2/g$ (BET) and a middle corn-diameter of 1 to 20 microns, by calcinating at about 600° C., hydromagnesite free from calcium and iron or by calcinating magnesium hydroxide at about 450° C.

Magnesium oxide is mixed with water and the suspension thus obtained is treated with gaseous $CO_2$ injected into the top of a reactor.

Preferably the product obtained by calcination of magnesite is used as magnesium oxide. The reactor is maintained at a carbon dioxide pressure above $5 \times 10^5$ pascals (5 bars) by feeding the gas phase of the reactor with carbon dioxide.

Contrarily to the already known process, the reaction product is diluted in water, to avoid any untimely precipitation of magnesium hydrogen carbonate, to obtain a diluted solution containing less than 80 g/l of magnesium carbonate, preferably about 20 g/l of magnesium carbonate.

The second step of the process consists of diluting the aqueous solution of $Mg(HCO_3)_2$ before decreasing the pressure of the solution to 1 atmosphere. This dilution results in the composition's appearing in an appropriate form and concentration, permitting it to be used immediately as activator of the photosynthetic activity of plants by simply spraying it on them.

This process according to the invention uses magnesium oxide of particle size below 20 microns, preferably particles of about 10 microns.

Figure 11:
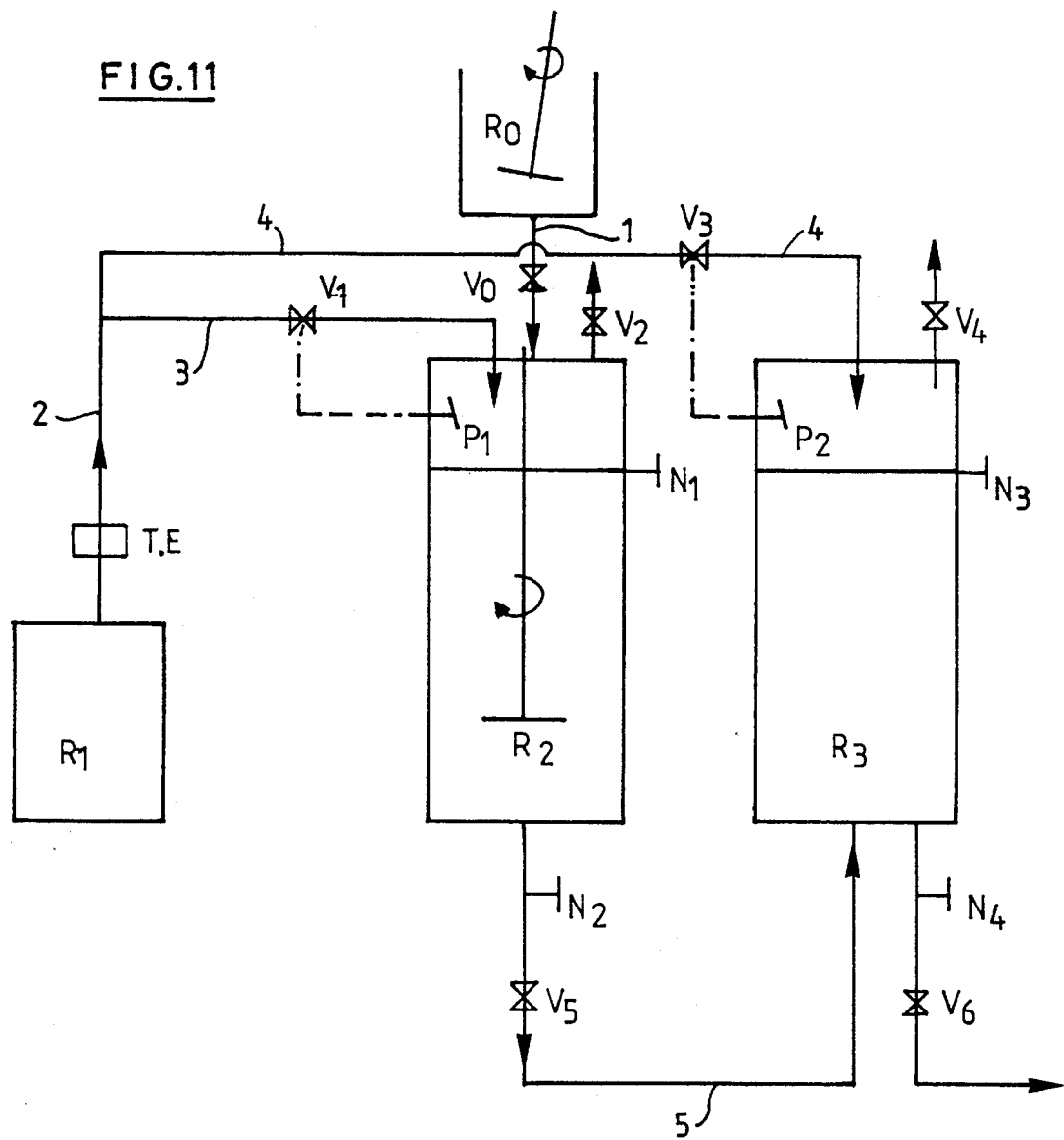
FIG. 11 shows diagramatically a mobile unit for extemporaneous production of magnesium hydrogen carbonate.
Figure 12:
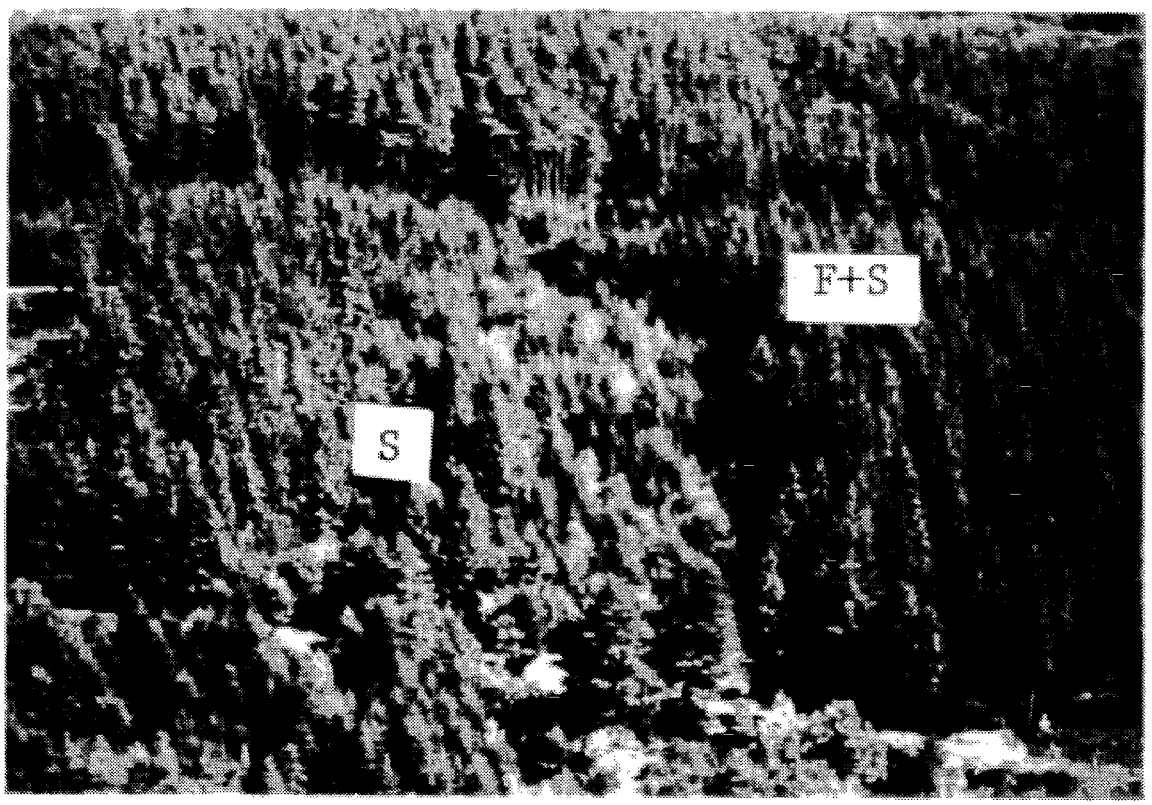
FIG. 12 is an infra-red air photograph of a separation line between untreated spruces in a control-area on the left side and treated spruces according to the invention on the right side.

A suitable apparatus for the preparation of a solution of magnesium hydrogen carbonate, according to the invention, discontinuously in successive batches is shown schematically in FIG. 11. This apparatus comprises a tank $R_0$ intended to disperse finely ground magnesium oxide in suspension in water, a reservoir $R_1$ of pure carbon dioxide at a pressure of $20 \times 10^5$ pascals (20 bars), a principal reactor $R_2$ provided with a powerful agitator to ensure the absorption of carbon dioxide and the transformation of magnesium oxide into magnesium hydrogen carbonate in the dissolved state and finally a transfer reactor $R_3$ connected with the reservoir $R_1$ and the principal reactor $R_2$. Each of the reactors $R_2$ and $R_3$ contains detectors of the filling level $N_1$, $N_2$, $N_3$, $N_4$ and measuring devices for the pressure $P_1$, $P_2$ existing in them.

Separately controlled pneumatic valves enable various sequences of operation constituting a manufacturing cycle to be carried out at the opportune moment. The operating scheme is the following:

1. Filling of the principal reactor $R_2$:

Suspension of magnesium oxide in water and filling of the reactor $R_2$ to the level $N_1$. As soon as the level $N_1$ is reached, the level detector orders the closing of the valve $V_0$, the opening of the valve $V_1$ (by use of the transmitter $P_1$) and the starting of the agitator. The other valves $V_2$ to $V_6$ are kept closed.

2. Reaction itself:

$$Mg(OH)_2 + 2CO_2 \rightarrow Mg(HCO_3)_2$$

As soon as the $CO_2$ pressure reaches $5 \times 10^5$ pascals (5 bars) in the top of the principal reactor $R_2$, a pressure transmitter $P_1$ ensures that the valve $V_1$ closes. (The valve $V_1$ closes at 5 bars and opens at 4.8 bars: it operates fully or not at all).

3. Draining of the reactor:

After a delay time of about 15 minutes under a pressure of $5 \times 10^5$ pascals (5 bars), the reactor $R_2$ starts transferring. The remaining suspension of $CO_2$ in the principal reactor $R_2$ enables the aqueous solution of magnesium hydrogen carbonate to be forced back to the transfer reactor $R_3$. To this end, the principal reactor $R_2$ is connected with a transfer reactor $R_3$ by a conduit 5 situated in the neighbourhood of its bottom part, and the transfer reactor $R_3$ is a closed enclosure provided in its upper part with a conduit 4 for the supply of gaseous carbon dioxide so as to pressurize this enclosure from above.

The enclosure is advantageously provided with a vent $V_4$ and means $V_2$, $P_3$ and $N_3$ intended to regulate the pressure prevailing in the enclosure and the liquid level in the enclosure.

We claim:

1. A method for enhancing and/or restoring photosynthetic activity in chlorophyllous plants consisting essentially of the step of foliar application to said plants of an aqueous solution of magnesium hydrogen carbonate of the formula $Mg(HCO_3)_2$, wherein said solution is free of any anion of a strong acid.

2. The method as claimed in claim 1, wherein said plants are sprayed with said aqueous solution, and wherein said aqueous solution contains not more than 80 g/l of magnesium hydrogen carbonate.

3. The method as claimed in claim 2, wherein said plants are sprayed with said aqueous solution, and wherein said aqueous solution contains about 20 g/l of magnesium hydrogen carbonate.

* * * * *